United States Patent [19]

Augustine et al.

[11] 4,082,823

[45] Apr. 4, 1978

[54] PROCESS FOR FORMING COATED PITCH PRILLS

[75] Inventors: Harry G. Augustine; Kenneth C. Krupinski, both of Pittsburgh; Frank A. Smith, Franklin Township, Westmoreland County, all of Pa.

[73] Assignee: United States Steel Corporation, Pittsburgh, Pa.

[21] Appl. No.: 637,262

[22] Filed: Dec. 3, 1975

[51] Int. Cl.² ............................................. B01J 2/06
[52] U.S. Cl. .......................................... 264/7; 264/13
[58] Field of Search ................................. 264/7, 13

[56] References Cited

U.S. PATENT DOCUMENTS

| 2,457,962 | 1/1949 | Whaley | 264/7 |
| 3,457,335 | 7/1969 | Elliott | 264/13 |

Primary Examiner—Donald J. Arnold
Assistant Examiner—James R. Hall
Attorney, Agent, or Firm—W. Gary Goodson

[57] ABSTRACT

Process for forming coated pitch prills by mixing pitch prills with finely divided carbonaceous material and agitating the prills and carbonaceous material until a layer of carbonaceous material adherently bonded to the pitch prill is formed. Preferably the pitch prill is a substantially spherical particle having an average diameter between about 1 and about 5 millimeters. The finely divided carbonaceous material is preferably carbon black.

7 Claims, 2 Drawing Figures

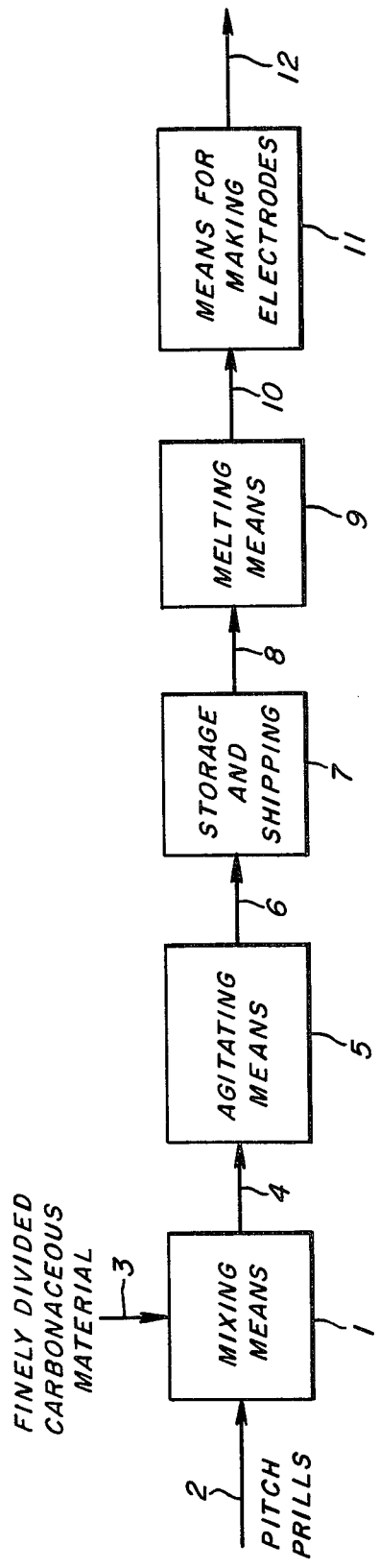
FIG. I.
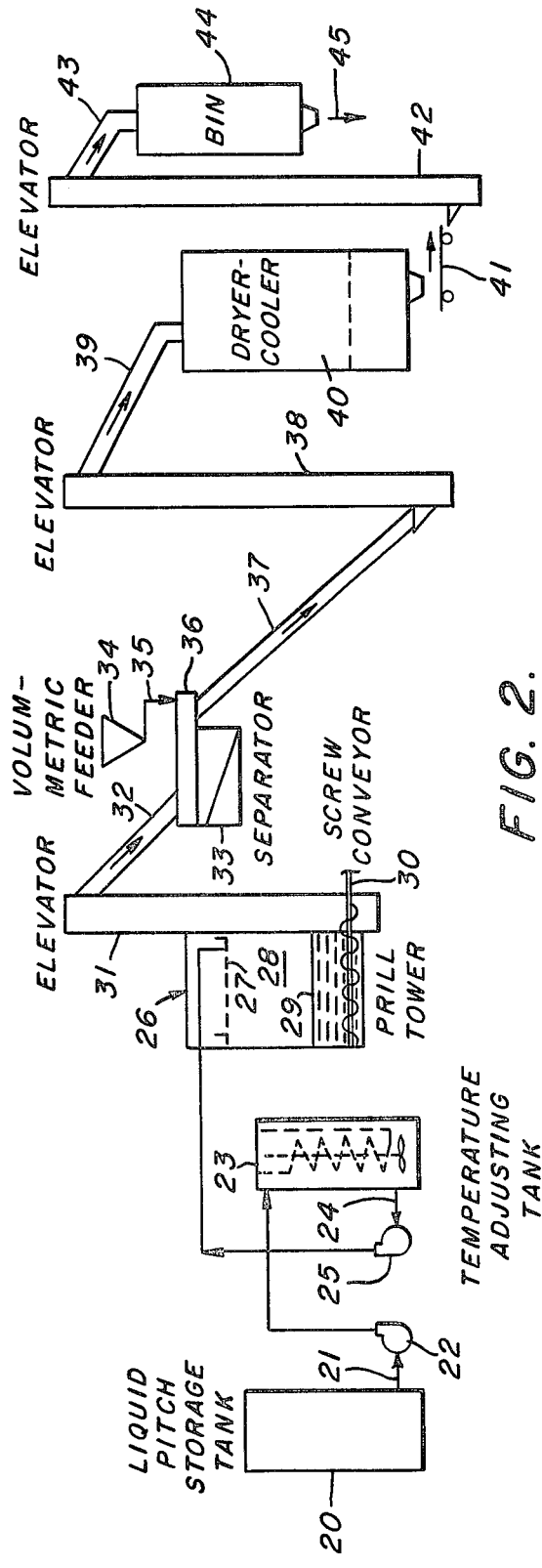
FIG. 2.

PROCESS FOR FORMING COATED PITCH PRILLS

BACKGROUND OF THE INVENTION

This invention relates to an improved process for producing a coated pitch prill. Pitch is a well known liquid hydrocarbon residue derived from coal and/or petroleum. A prill is a solid particle or pellet.

Pitch prills are used widely as a binder in the manufacture of electrodes for use in electrochemical processes. Two such applications of prime importance are as binders in preparing carbon anodes for aluminum reduction cells or binders for preparing graphite electrodes for electric steelmaking furnaces. Two serious problems which have plagued this industry are (1) the caking and fusing problem and (2) the dustiness problem of the pitch prills, especially in the handling necessary in storage and shipping. The caking and fusing problem is especially severe when the prills must be shipped or stored in storage vessels such as in the hulls of ships 10 to 20 feet in depth for several days at higher temperatures such as 100° to 130° F. The combination of pressure and temperature over this time period often results in sticking together of the prills (caking) or complete fusion of the prills into a unitary mass which in both cases becomes an extremely difficult, costly and time consuming unloading problem, especially after the pitch has rehardened.

The dusting problem besides being very annoying to workers, creates potential hazards to health due to the noxious substances often found in pitch. Various attempts have been made to solve these problems in the past.

One attempt to overcome the caking and fusing problem is shown in U.S. Pat. No. 2,550,838 wherein the pitch prill is coated with material such as alkaline chlorides and sulfides, finely divided mineral substances, etc. However, the coating materials used in this patent would not be satisfactory for the electrical applications mentioned above due to the impurities added to the electrodes which would result in deterioration of the electrical properties of the electrode and objectional impurities in the product produced by the electrochemical process.

One approach for cutting down on the dustiness problem in handling of the prills is to form a substantially spherical prill by controlled dripping of the liquid pitch into a cooling medium such as water in a manner which would substantially control the spherical shape of the prill. However, this approach is only partially successful and considerable amounts of dust are generated when handling the prills, especially in a windy or drafty environment.

DESCRIPTION OF THE INVENTION

A coated pitch prill comprises a pitch prill having adherently bonded to the exterior surface thereof finely divided carbonaceous material in sufficient amounts to prevent agglomeration of the prills at ordinary temperatures and pressures such as encountered under conventional storage and shipping conditions, and the carbonaceous material being present in sufficient amount to reduce the dusting tendency of the prills during handling but not in such quantities that free carbonaceous material is present beyond that acting as a coating. These coated prills are produced by intimately mixing pitch prills with a finely divided carbonaceous material and agitating the prills and carbonaceous material until a layer of the carbonaceous material is adherently bonded to the surface of the prill. The coated pitch prills of this invention are useful as binders for making electrodes for electrochemical processes.

In a preferred process of making these coated prills a liquid pitch droplet is first formed, then the droplet is rapidly cooled to form prills, preferably by contacting the prills with an aqueous cooling bath. The prills are then separated from the cooling bath and the damp prills which have been separated from the cooling bath are then intimately mixed with a finely divided carbonaceous material. The prills are then dried using heat and agitation to produce a coating adherently bonded to the prill which resists agglomeration at ordinary shipping and storage temperatures and pressures and which coating reduces the dusting tendency of the prill during handling. Preferably the finely divided carbonaceous material is in pellet form which disintegrates upon contact with water which is present on the prills.

An apparatus for forming coated pitch prills comprises a means for intimately mixing pitch prills with the finely divided carbonaceous material and means for agitating the prills and carbonaceous material until a layer of carbonaceous material adherently bonded to the prills is formed.

DESCRIPTION OF THE PREFERRED EMBODIMENT(S)

The pitch prills produced by the process of this invention may be of varied size and shape and produced by many different processes. Due to the advantages mentioned above of substantially spherical prills and especially those having an average diameter of between about 1 and about 5 millimeters, these are preferred in this invention. These may be formed by forming liquid droplets of pitch which are cooled by dropping into a water bath at a distance such that the liquid droplet substantially retains its spherical shape in order that substantially spherical prills are produced. The distance of free fall of the droplets is less than that which would cause significant deformation of the droplet on contact with the cooling bath. The cooling bath has a sufficiently low temperature to prevent agglomeration of the prills but not such a low temperature as to result in significant fracturing of the prills. Preferably, the liquid droplets are formed by supplying the liquid pitch to a prilling plate having a diameter between about 1 and about 5 millimeters. Preferably the liquid pitch then passes through these holes by gravity flow. The viscosity of the liquid pitch, the depth of the pitch above the prilling plate, the distribution of holes in the prilling plate to the surface of the cooling bath are significant variables which are so controlled that a substantially uniform spherical droplet is obtained before the droplet reaches the surface of the cooling bath. The temperature of the cooling bath must also be controlled in conjunction with the flow rate of the liquid pitch droplet in order to prevent the droplets from sticking together and in order that the droplets can be rapidly solidified and preferably removed from the cooling bath for further treatment. This further treatment usually involves removing the cooling liquid from the prills, drying the prills in a manner which minimizes abrasion and friction of the prills but provides sufficient agitation for applying the coating as described above and, finally, cooling the prills so that they may be stored under the desired storage conditions. In the preferred process of making the prills, the distance of free fall of the liquid pitch droplets is preferably between about ⅓ and about 3 meters. The streams of liquid pitch preferably have a viscosity of between about 1500 and about 2500 centipoises and more preferably about 2000 centipoises at the surface of the prilling plate.

The preferred liquid pitch materials used in the process of this invention have a Mettler softening point of greater than about 80° C (ASTM No. D3104-72). More preferably, the liquid pitch materials have a softening point between about 95° C and about 150° C.

In the preferred process of this invention, the liquid pitch droplets fall in a space filled with gas or vapor such as air. More preferably, this space contains air, water vapor and gases from the pitch. In the preferred process, the cooling bath is a liquid which is immiscible with and does not significantly dissolve the liquid droplets and/or the prills. This liquid is preferably water. The temperature of the liquid may be regulated by adding cool liquid from an outside source or by cooling by an external means such as a refrigeration unit.

The finely divided carbonaceous material used in the process of the invention is a material composed of a very high percentage of carbon, such as over 90% carbon, and which is substantially free of impurities which would interfere with the electrical properties of electrodes for electrochemical purposes. Some preferred materials useful as carbonaceous materials in this invention are carbon blacks such as furnace or lamp black (which are partially oxidized hydrocarbons), and thermal black; micronized needle coke; micronized sponge coke; artificial or natural graphite; and coal or petroleum coke. It has been found that the smaller the particle size of the finely divided carbonaceous material, the more effective this carbonaceous material is in reducing the caking tendency of the prills. A preferred average particle size is between about 0.01 and about 50 microns with an average particle size of between about 0.01 and about 0.9 microns being most preferred.

The finely divided carbonaceous material preferably is applied to the exterior surface of the prills in an amount between about 0.25 weight percent to about 1.0 weight percent of the dried prills. The most preferred application rate is between about 0.4 weight percent and about 0.6 weight percent of the dried prills.

FIG. 1 is a block flow diagram showing the process of forming coated pitch prills and using these prills to make electrodes.

FIG. 2 is a schematic process flow diagram illustrating a preferred method of producing pitch prills.

Referring to FIG. 1, the pitch prills are added to the mixing means 1 by inlet 2 and the finely divided carbonaceous material is added to mixing means 1 by inlet 3. The mixed carbonaceous material and pitch prills are then passed through line 4 to agitating means 5 where sufficient agitation takes place to provide a coated prill having a coating of carbonaceous material adherently bonded to the prill. It is not known exactly why the adherent coating is formed. However, it is believed that it may be a combination of electrical, mechanical and chemical bonding. It is theorized that the finely divided carbonaceous material, especially the sub-micron size, has a negative charge and is attracted to the positively charged prill. Additionally, the magnified surface of the prill even when substantially spherical, is rather rough and is believed to produce a mechanical interlocking with the fine carbonaceous material. Furthermore, it is believed that a weak chemical bond between the finely divided carbonaceous materials with the surface of the pitch prill exist.

The coated prills are then transferred by line 6 to storage and shipping means 7. This storage and shipping means 7 may take a variety of forms. However, a common way is to store and ship in bulk in depths from about 5 to about 25 feet being common. The temperatures in storage and transit may easily range between about 70 and about 130° F. The length of storage may be widely varied. However, 1 to 2 weeks is not uncommon. From the storage and shipping means 7 the coated prills are transferred as indicated by line 8 to melting means 9 where the prills are melted to form a liquid pitch which is then transferred by line 10 to the means for forming electrodes 11 where electrodes suitable for use in electrochemical cells are produced by using the liquid pitch as a binder. The final products are then removed by line 12 for use in the manufacture of electrochemical cells.

Referring to FIG. 2, hot liquid pitch (Mettler softening point in the range from 80° to 120° C) is pumped from storage tank 20 through line 21 by pumps 22 to a temperature-adjusting tank 23, where the liquid pitch is brought to the correct prilling temperature. The liquid pitch from the temperature-adjusting tank 23 is pumped through line 24 by pump 25 to the prilling plate 27 in the prill tower 26. The liquid flows through holes in the prilling plate 27 to form droplets, which cool and solidify as they fall through a space 28 and into a cooling bath 29, of temperature-controlled immiscible liquid such as water.

The solid prills, 1 to 5 millimeters in diameter, settle to the bottom of the prill tower 26 and are moved by screw conveyor 30 to a bucket elevator 31 which conveys the wet prills to a separator 33, such as a dewatering screen, for separating the prills from the immiscible liquid. As the wet pitch prills fall down a chute 37 from the separator 33, a finely divided carbonaceous material is metered continuously from a volumetric feeder 34 through line 35 onto the falling prills moving through the passageway 36 and the chute 37.

A bucket elevator 38 and a passageway 39 conveys the coated, wet prills to the top of a dryer-cooler 40 such as a Wyssmont drier which dries with a minimum of abrasion but does provide suitable agitation for forming the coated prills. As the prills are dried and cooled in this apparatus 40, the coating is thoroughly and substantially uniformly applied to the surface of the prills.

The cool, dry, coated pitch prills are conveyed by transit means 41 to the bucket elevator 42 and line 43 into a storage bin 44 and finally through exit line 45 for shipping.

EXAMPLES 1 AND 2

The following experiment shows the advantage of the coated prills of this invention compared to a control amount of uncoated prills in significantly decreasing the dust problem and the caking problem of the control in field conditions of storage and handling.

Pitch prills (spherical pellets of pitch, 3 to 5 mm in diameter) are produced as illustrated in FIG. 2, in a prill tower, wherein hot liquid-pitch droplets from a perforated prill plate fall through air into a bath of water. The solid prills are transferred from the prilling tower by a screw conveyor to a bucket elevator that discharges to a dewatering screen. The solid prills from the dewatering screen flow down a chute into a bucket elevator that conveys the prills to the top of the dryer. Pelletized thermal black which readily disintegrates on wetting with water and agitation to a dust having an average particle size of about 0.5 microns.

Before conducting the plant-scale run, sufficient pelletized thermal black was obtained to permit application of about 0.5 weight percent of black to a 90-ton hopper car of prills. Arrangements were also made to provide, as a control, a hopper car of identically prepared prills except lacking the thermal black coating.

Ninety tons of coated prills were loaded into one hopper car, and about 90 tons of uncoated prills were produced and loaded into the second car. After loading, both car tops were covered with plastic film and the cars moved to the freight yard for transfer and storage in a warmer climate storage site.

The test cars were placed on a track that had a north-south alignment so that the sides of the cars faced the sun throughout the day. The pitch prills arrived at the storage site in good condition; however, the prills in both cars had settled about 3 feet in transit.

A series of 9/32-inch-diameter (7.1mm) holes was drilled in various parts of the hopper cars for installation of thermocouples to measure prill temperatures during storage. One thermocouple was placed in the top-center air space, another one foot (305 mm) down in the prills, a third in the center of the west side about one foot inside, and a fourth in the bottom, west side of each car. Two additional thermocouples were placed in the east side of each car. The installed thermocouples were connected to a selector switch, and a Minimite potentiometer was used to measure the temperatures in the test cars.

Temperatures of the pitch prills were recorded at various times during the day and night (except Saturdays and Sundays) during the period from Oct. 14 to Dec. 16.

The samples of coated and uncoated prills, which were collected during the plant run, were examined microscopically to observe the general appearance of the prills and the distribution of thermal black on the surface of the prills.

The pitch properties of the coated and uncoated prills were obtained by standard laboratory test methods.

To determine whether the addition of the thermal black to pitch prills would create an undesirable dust problem, the coated and uncoated prills were tested in an elutriation dust analyzer that was designed to measure the dustiness of dried coal slurries. The pitch samples were placed in a cylindrical glass tube with air being blown up through the sample from the bottom of the tube. A dust collector at the top of the tube collected the dust during the test. In one test the glass tube was held stationary with mild agitation of tube. In another test the tube was tumbled by rotating the tube 360° end over end. The test was run for the same time period and under the same conditions for the coated and the uncoated prills.

RESULTS AND DISCUSSION

The pitch prill plant operating data is as follows:

The melting point of the pitch feed and the pitch prills was essentially the same for the coated and uncoated prills. The prill moisture content was also essentially the same for both the final prill product and the dewatering-screen samples. Product-prill temperature was slightly higher for the coated prills: 26.7 C average (299.8 K) vs 23.3 C average (296.4 K) for the uncoated prills. The feed rate, in gallons per minute, was a little higher for the uncoated prills [37 gpm (p.15 m$^3$/min) compared with 33 gpm (0.13 m$^3$/min)] for the coated prills. The prill-tower water temperatures were the same and the slight difference in dryer temperatures could be due to the fact that the coated prills were made early in the day (cool) and uncoated prills later (warmer).

Visual and microscopic examination of the coated pitch prills showed a uniform coating of the thermal black on the prills. The coating gave the prills a dull, charcoal-gray appearance as compared with a bright, lustrous black appearance for the uncoated prills.

A comparison of the physical properties of coated and uncoated prills is as follows: The softening point was 110 C (383.15 K) for both pitches, ash was 0.21 weight percent for the control and 0.22 weight percent for the coated prills, and specific gravity at 15.5 C/15.5 C was 1.32 for both. These properties were essentially unchanged by application of the coating. However, the quinoline insolubles (17.9 wt % for control and 18.4 wt % for the coated prills), the benzene insolubles (31.1 wt % for control and 31.5 wt % for the coated prills), and coking value (57.8 wt % for the control and 59.1 wt % for the coated prills) were elevated because of the thermal-black addition.

The average temperatures recorded for the various locations in the prill hopper cars showed no general pattern or trend. The temperatures were nearly identical, especially in the west side bottom thermocouple area, where the temperatures showed the least fluctuation. From the standpoint of temperature, the bottom area of the stored prills is most important because that is where the maximum pressure is generated by the overlying prills. The maximum recorded temperature in the west bottom area was 25.5 C (298.65 K) for the uncoated prills and 24.5 C (297.65 K) for the coated pitch prills.

Following storage of the hopper cars, the coated and uncoated pitch prills were shipped to a graphite plant in Tenn., for unloading and green-electrode forming tests. On December 19 and 20 the 90 tons of carbon-black-coated pitch prills were unloaded from the hopper car without difficulty. The coated prills were completely free flowing throughout the unloading period. However, the uncoated prills in the control hopper car had caked badly and were very difficult to unload.

The coated pitch prills were used in combination with a petroleum-coke aggregate to produce a mix that was extruded without difficulty into 16-inch-diameter (406 mm) green electrodes.

Personnel at the plant were very pleased with the outcome of the plant-scale test and commented that significantly less dust was observed while using the coated prills to form green electrodes as compared to using the uncoated prills for this purpose.

The results of dust tests were in agreement with the plant personnel observations. The dust collected from the coated prills was 38 mg compared with 51 mg for the uncoated prills. There was also more dust remaining on closed-gate container walls when the uncoated prills were shaken (17 mg for uncoated prills versus 6 mg for coated prills) and tumbled (33 mg for uncoated prills versus 2 mg for coated prills).

We claim:

1. In a process for forming coated pitch prills useful as binders for making electrodes for use in electrochemical processes comprising
    (a) forming droplets of molten pitch, (b) rapidly cooling the liquid droplets to form prills by contacting the prills with an aqueous cooling bath,
(c) separating the prills from the cooling bath, and
(d) drying the prills using heat and agitation, the improvement comprising following step (c) intimately mixing the prills which have been separated from the cooling bath while still wet with a finely divided carbonaceous material to produce a surface coating adherently bonded to the prills which resist caking or fusion of the prills at ordinary shipping and storage temperatures and pressures and which coating reduces the dusting tendency of the prill during handling.

2. Process as in claim 1 wherein the carbonaceous material to provide said surface coating for said prills is a pellet which disintegrates upon contact with water.

3. Process as in claim 1 wherein drying step (d) is followed by a cooling step which helps the coated prills resist caking.

4. Process as in claim 1 wherein the carbonaceous material is carbon black.

5. Process as in claim 1 wherein the pitch prills are substantially spherical in shape and have an average diameter of between about 1 and about 5 millimeters.

6. Process as in claim 4 wherein the carbon black is present in an amount between about 0.25 and about 1.0 percent by weight of the dried prills.

7. Process as in claim 4 wherein the carbon black is thermal black and is present in an amount of about 0.4 weight percent of the dried prills.

* * * * *